United States Patent [19]
Ferro

[11] Patent Number: 5,644,256
[45] Date of Patent: Jul. 1, 1997

[54] HIGH-SECURITY ELECTRIC SUPPLY CIRCUIT FOR MACHINE CONTROL SYSTEMS

[75] Inventor: Silvano Ferro, Turin, Italy

[73] Assignee: REER S.p.A., Turin, Italy

[21] Appl. No.: 566,798

[22] Filed: Dec. 4, 1995

[30] Foreign Application Priority Data

Dec. 29, 1994 [IT] Italy ................... TO94A1086

[51] Int. Cl.[6] ................................. H03D 13/00
[52] U.S. Cl. ................................. 327/41; 327/40
[58] Field of Search ..................... 327/39, 40, 41, 327/42–46, 23, 24, 2, 3, 7, 47, 509, 517, 563, 560

[56] References Cited

U.S. PATENT DOCUMENTS

| Re. 33,301 | 8/1990 | Oshikiri et al. | 327/41 |
| 3,532,994 | 10/1970 | Ferrier | 327/41 |
| 4,564,837 | 1/1986 | Awano | 327/39 |
| 5,371,417 | 12/1994 | Mirov et al. | 327/41 |

FOREIGN PATENT DOCUMENTS

| 0021163 | 1/1981 | European Pat. Off. | G08B 13/18 |
| 0579233 | 1/1994 | European Pat. Off. | F16P 3/14 |
| 0602695 | 6/1994 | European Pat. Off. | H02H 3/00 |

Primary Examiner—Toan Tran
Attorney, Agent, or Firm—Guido Modiano; Albert Josif

[57] ABSTRACT

An inherent-security signal comparator (COMP) is driven by two or more input signals (V1, *V2) coming from a control system (µP1, µP2) and generates an alternate output signal (C) of a predetermined frequency whenever both its input signals are identical and terminates its output signal when its input signals wander off from identity, or any of the circuit components of the comparator break down, or its d.c. supply is interrupted. An amplifier (AMP) driven by the comparator drives an isolating transformer (TR) coupled to a voltage rectifier/regulator device (REG) for the supply to the control system. Preferably an oscillator (OSC), whose output is connected to the input of the amplifier (AMP) in common with the output of the comparator, is supplied by a voltage pulse generated by a monostable circuit (T3-R7-R8-R9-C5-C6-D1-D2) which is momentarily enabled at the start-up of the supply circuit.

7 Claims, 2 Drawing Sheets

HIGH-SECURITY ELECTRIC SUPPLY CIRCUIT FOR MACHINE CONTROL SYSTEMS

BACKGROUND OF THE INVENTION

This invention is concerned with a high-security electric supply circuit for tool machines control systems of machines such as tool machines and the like.

In several fields of industrial activity, machines or equipment are used where dangerous conditions can arise whenever a breakdown or malfunction develops in their control systems or circuits. Examples of such situations are, e.g.: photoelectronic barriers (light curtains) protecting presses and the like; turbine or nuclear plant control systems, metering systems for chemical plants, etc. In all such cases, sophisticated control circuits are put to duty, which incorporate techniques such as self-diagnosis and circuit redundance, particularly circuit duplication, with the intent of preventing a breakdown in the control system from causing catastrophical consequences.

Often the signals monitoring the conditions of the apparatus under control are processed in a control circuit comprising two substantially similar channels, which mostly comprise respective microprocessors jointly controlling several peripheral devices, such as relays, valves, pilot lights, etc. Such channels are designed so that they each independently provide respective monitoring signals, which must be identical at all times, so that any deviation from identity points to an internal malfunction making the control circuit unreliable for further driving the machine. Therefore, when the malfunction has once been established, the control circuit must be itself disabled and the machine must be stopped.

In order to achieve the disabling of the control circuit, it is known to provide the supply circuit itself with a device, known as "watchdog", which will receive the above monitoring signals and will continuously compare them with each other, and will turn off the supply circuit whenever the monitoring signals are unequal, so that the control system is disabled with certainty. As a watchdog device it has been proposed to use a monostable multivibrator which must be continuously retriggered in order to maintain the supply alive. Thus, a failure of the monostable circuit to retrigger immediately cuts the supply to the control voltage, with consequent drop of any relays and actuators controlled thereby.

However, such a system is not safe from trouble which might arise in the watchdog itself, say from a a short making the watchdog deliver a constantly high output.

A main object of the invention is therefore to provide an electric supply circuit which is controlled by two or more input signals, and which has a feature of inherent security, i.e. which will guarantee that the supply is turned off not only in case of unequality of its two input signals, but also in case of any internal breakdown of its own.

SUMMARY OF THE INVENTION

The invention achieves the above and other objects and advantages, such as will appear from the following disclosure, by providing an inherent-security electric supply circuit for a machine control system, characterized in that it comprises:

an inherent-security signal comparator, driven by two or more input signals delivered by different parts of the control system, and capable of generating an alternate output signal of a predetermined frequency whenever both its input signals are identical and of terminating said output signal whenever said input signals wander off from identity, or anyone of its circuit components breaks down, or its d.c. supply is interrupted;

an amplifier driven by said alternate output signal, and in its turn driving an isolating transformer coupled to a voltage rectifier/regolator device for the supply to said control system.

BRIEF DESCRIPTION OF THE INVENTION

A preferred embodiment of the invention will now be described, by way of nonlimiting example, with reference to the attached drawings, wherein.

DESCRIPTION OF A PREFERRED EMBODIMENT

Figure 1:
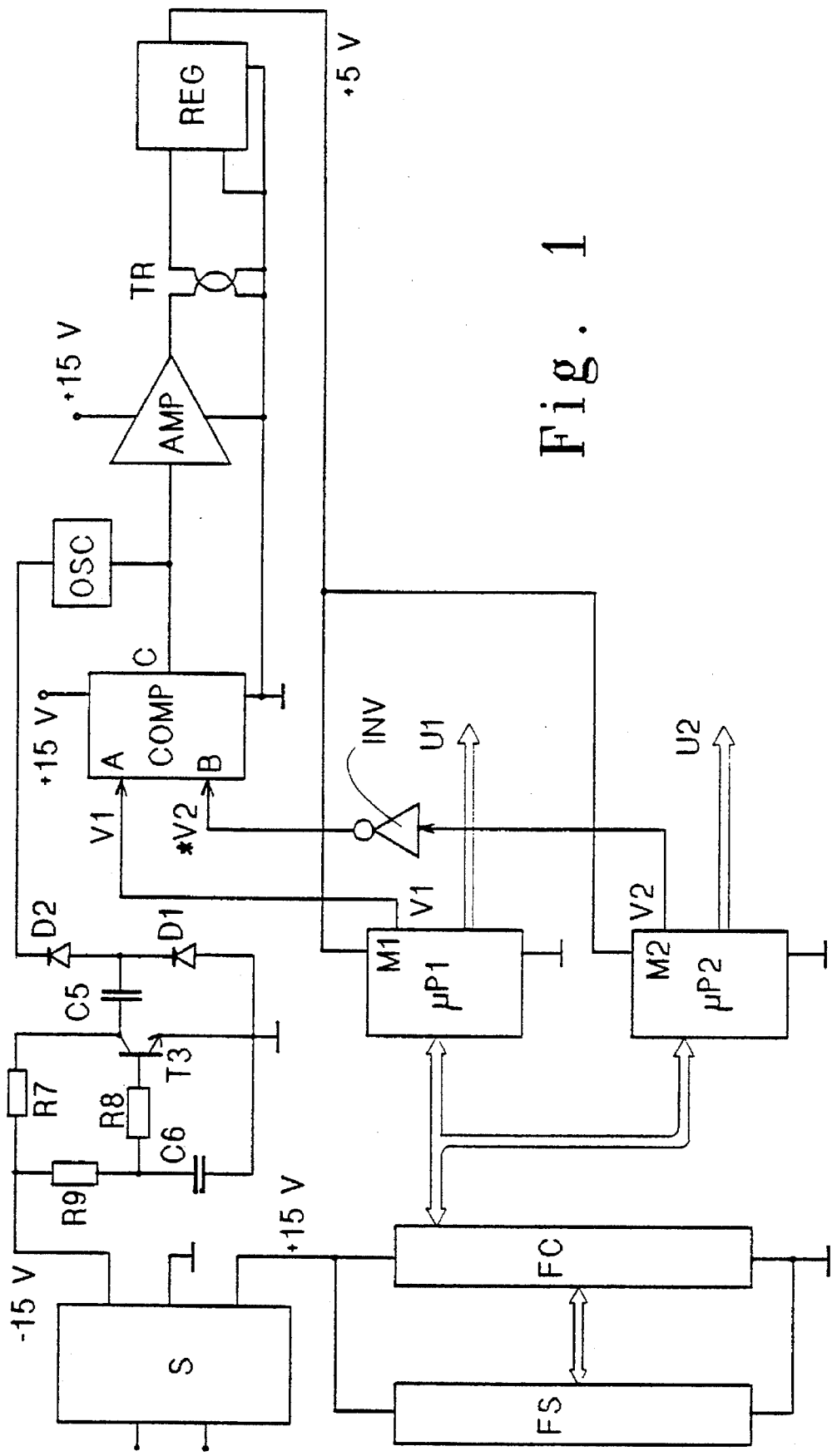
FIG. 1 is a partially schematic circuit diagram of a control system for a photoelectronic barrier, comprising a supply circuit according to a preferred embodiment oft he invention.

With reference to FIG. 1, a high-security comparator COMP for analog signals, which is further described below, has two inputs A and B for respective predetermined signals, and an output C which is connected to the input of an amplifier AMP. Amplifier AMP supplies, through an isolating transformer TR, a conventional rectifier/regulator circuit REG, which is adapted to rectify the alternate voltage received by transformer TR and to regulate it to deliver a continuous supply voltage, say at +5V, for an electronic control system comprising two microprocessors µP1, µP2, each of which processes digital signals of various nature originating from light detectors FS and from their scanning circuitry FC, as well as, possibly, from other accessory circuits not shown, through multiple lines I1, I2. Both microprocessors µP1, µP2 perform similar processing cycles, in a way known per se, and generate respective enabling or controlling signals on multiple output lines U1, U2, which are intended for driving actuators, relays, pilot lamps, etc. (not shown), also in a way known per se.

Figure 2:
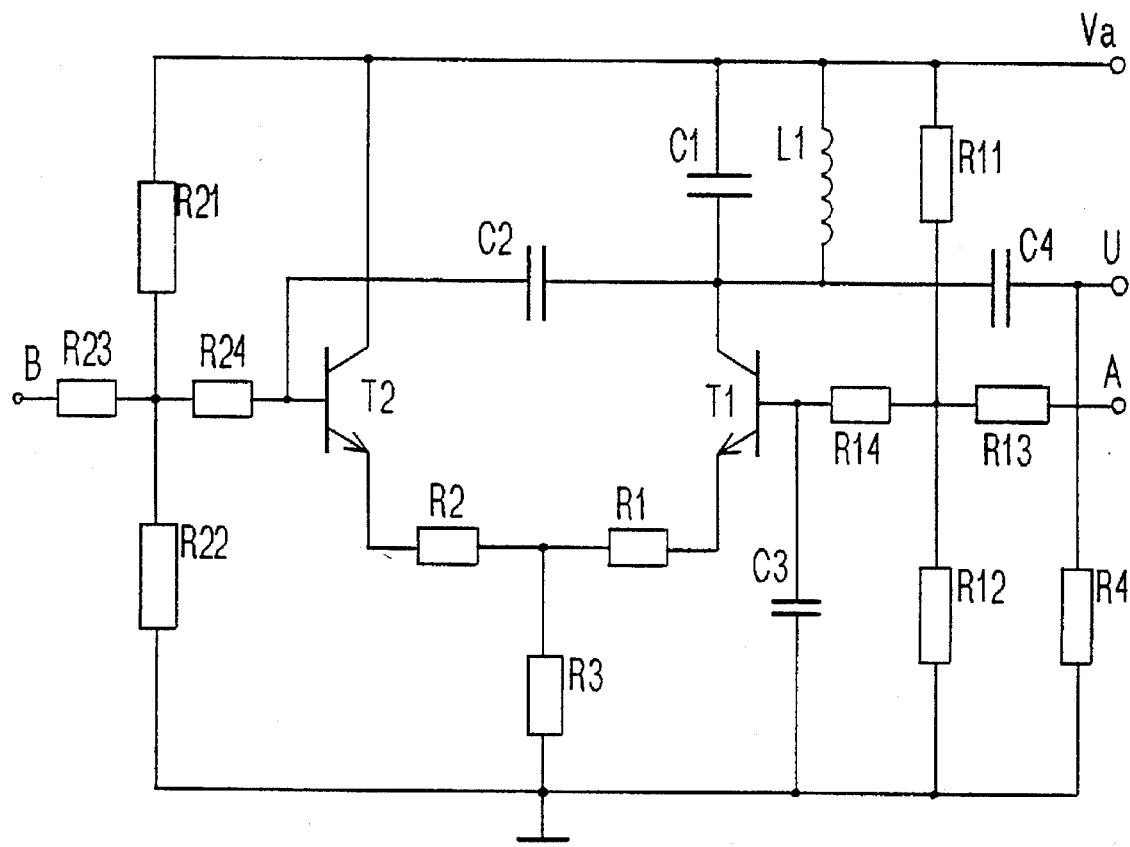
FIG. 2 is a circuit diagram of a high-security comparator which is part of the system of FIG. 1.

The high-security analog comparator COMP is preferably of the type disclosed in EP-A-0 602 695, with title "Inherent-security comparator device, particularly for optoelectronic barriers". As shown on FIG. 2, it comprises two identical bipolar transistors T1 and T2, whose emitters, through respective resistors R1 and R2, also identical with each other, are connected to a common resistor R3 leading to ground. The collector of transistor T1 leads to a positive supply voltage Va through a resonator comprising an inductor L1 and a capacitor C1 connected in parallel, while the collector of transistor T2 is directly connected to the supply. Moreover, the collector of transistor T1 is coupled in positive feedback to the base of transistor T2 through a capacitor C2.

The analog signals to be compared in the comparator are applied to inputs A and B, and they are then transferred to the bases of transistors T1 and T2 through matching resistive networks R11, R12, R13, R14, and R21, R22, R23, R24, respectively. Finally, a capacitor C3 is connected between ground and the base of transistor T1, thus forming a low-pass filter with resistor R14. The output signal from the comparator is derived from the collector of transistor T1 through a high-pass filter comprising a capacitor C4 and a resistor R4.

When identical signals are applied to inputs A and B of the comparator described above, both transistors T1 and T2 are biased to an identical conduction state, and the circuit, due to resonator L1, C1 and to the capacitive feedback C2, starts oscillating, the generated frequency appearing as an output signal on terminal U. According to the invention, the generated frequency is preferably chosen at 50 kHz.

It can be seen that the oscillation of the circuit described above is maintained even if the input signals change, provided that they remain equal. It can also be seen that the conditions for oscillation fail if any of the input signals vanishes or is reduced in amplitude with respect to the other by more than a predetermined tolerance, because in that case it will remove the bias from the associated transistor. Finally, it can be seen that any breakdown or alteration in any component of the circuit will also give rise to the immediate termination of the oscillation. For a more detailed analysis of the circuit operation in different situations, reference is made to the above-cited EP-A-0 602 695.

Figure 3:
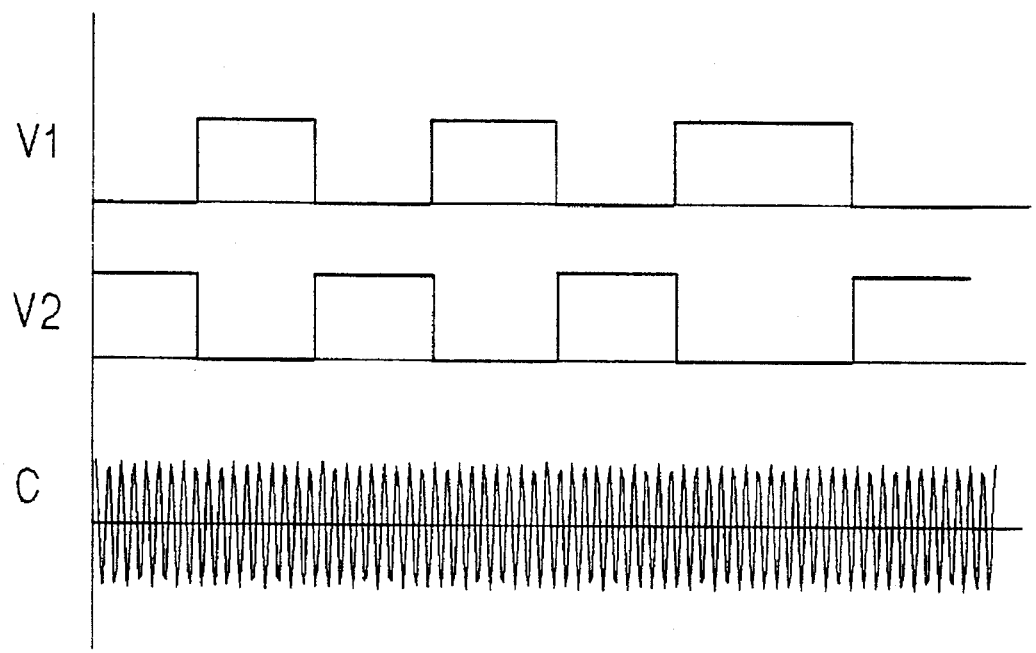
FIG. 3 is a collection of waveshapes appearing in the operation of the circuits of FIG. 1.

With further reference to FIG. 1, each of microprocessors µP1, µP2 generates, among other signals, a respective square signal or waveshape V1 on an output terminal M1, and, respectively, V2 on a terminal M2. Signals V1 and V2 are produced by switching the terminal from 0 to +5V and vice versa, at crucial points in the program cycle. Microprocessor µP2 performs such switching at the same cycle points of microprocessor µP1, but with inverted course, so that signal V2 (FIG. 3) as delivered on terminal M2 is negated with respect to signal V1 on terminal M1. Both signals V1 and V2 are applied to the respective inputs A and B of comparator COMP, the former signal directly, the latter through an inverter INV which negates it, thus making it identical to the former.

Any breakdown or malfunction in one or the other of microprocessors µP1 o µP2, whether it concerns the hardware or the software, will cause a change in the program cycle, which will reflect in changes of the switching of the output terminal M1 or M2, so that waveshapes V1 and V2 will now be unequal. As soon as such change of one signal with respect to the other appears at the inputs of comparator COMP, the comparator will detect the disagreement and will stop from oscillating, thus cutting the supply power to the rectifier/regulator, and therefore cutting the electric supply to the microprocessors. It should be noted that any continuous voltages which may result on terminal C are eventually blocked by the isolating transformer TR.

With further reference to FIG. 1, the high-security supply circuit of the invention also comprises an auxiliary oscillator OSC, whose output is connected to the input of amplifier AMP, in common with the output from comparator COMP. Oscillator OSC receives its own supply from a monostable circuit comprising a capacitor C5 having one plate connected to the junction of two diodes D1, D2, of which the former is connected to ground and the latter to the supply terminal of said oscillator, and the opposite plate connected to the collector of a transistor T3. The emitter of transistor T3 is grounded, while its collettor is connected to a negative voltage, say −15V, through a resistor R7. The base of transistor T3 is connected, through a resistor R8, to a resistor-capacitor combination R9-C6, which is connected between said negative voltage and ground.

The negative voltage at −15V is preferably one of the two polarities, +15V and −15V, which are generated by a general supply S for the entire control system, and which is itself supplied by the mains voltage.

When general supply S starts operating, as a consequence of an electric mains switch (not shown) being closed, transistor T3 is initially cut off, because capacitor C6 ensures that a substantially null voltage is maintained on the base of the transistor. At the same time, the negative voltage −15V is applied, through resistor R7, to the left-hand plate of capacitor C5, whose right-hand plate leads to the ground potential through diode D1. A negative electric charge therefore accumulates on the left-hand plate, and a positive charge accumulates on the right-hand plate. Capacitor C6 is progressively charged, and its junction with resistor R9 rises in voltage until it reaches a value such that transistor T3 is enabled. The left-hand plate of capacitor C5 is then brought substantially to ground, and the right-hand plate is forced to rise in voltage in a positive direction, unhindered by the high value of the inverse resistance of diode D1. The positive voltage thus developed is then applied to oscillator OSC through diode D2, which operates in a direct direction and therefore has a low resistance. Oscillator OSC, thus driven, will start oscillating and will generate a voltage at a frequency of 50 kHz, which is then amplified in amplifier AMP to an adequate power level and transferred to rectifier/regulator REG, to be converted to a continuous voltage of +5V for the supply of microprocessors µP1, µP2 and/or other desired circuits or devices. It should be noted that, during this initial step, the output from comparator COMP is null, because microprocessors µP1, µP2 are not delivering yet any monitoring signal V1, V2, and input A of the comparator is consequently null, while input B is high. Due to the operation of oscillator OSC, the microprocessors are now supplied and start performing their processing cycles.

After oscillator OSC has consumed all the charge stored on capacitor C5, i.e. when the voltage supplied by the capacitor is no longer sufficient to keep it operating, the oscillator dies, but, in the meantime, comparator COMP has started to receive the monitoring signals V1, *V2 from microprocessors µP1, µP2, and thus replaces oscillator OSC in supplying amplifier AMP with the supply power for the microprocessors.

It can be seen that any breakdown in the supply circuits according to the invention, whether in its internal components or in the supply thereto, must necessarily lead to an interruption in the supply to the microprocessors. It has been pointed out above that any breakdown in comparator COMP will stop its oscillation, and therefore will terminate the signal applied to amplifier AMP. Should a breakdown take place in the comparator or the amplifier, such as to cause a continuous voltage to appear at the amplifier output, transformer TR will prevent it from reaching rectifier/regulator REG.

Oscillator OSC, which is designed to operate with a positive supply, is momentarily supplied by a circuit which, as pointed out above, uses an exclusively negative supply voltage: consequently, whatever breakdown in that circuit will, at the worst, produce a negative voltage, which is incapable of operating the oscillator.

In conclusion, the watchdog circuit of the invention, comprising monostable circuit C5-C6-D1-D2-T3-R7-R8-R9, comparator COMP, auxiliary oscillator OSC, amplifier AMP, isolating transformer TR and rectifier/regulator REG, will ensure, both in the start-up period and in the steady-state operation of the system, that not only an anomaly in the barrier or its control circuitry, but also any malfunction in the watchdog itself inevitably leads to disable the control circuitry.

It is understood that the high-security supply circuit as described above can be applied not only to a photoelectronic barrier, as shown by way of example, but also to any control system in which, according to well known techniques, circuit redundancy or duplication is relied on for generating two monitoring signals which are supposed to be normally identical, and whose disagreement should therefore signals an alert. The microprocessors themselves have been shown by way of example, as the monitoring signals could come from other sources.

The preferred embodiment described and shown above is also liable to many changes. For instance, the 50 kHz frequency, which was chosen to be easily discriminable from the frequencies of 100 or 120 Hz which are mostly used in supplies, can vary in a wide range. The monostable circuit for momentarily supplying auxiliary oscillator OSC might be replaced with a capacitor connected to any circuit which can discharge the capacitor by switching it with respect to ground, or, in general, with any other device which can safely deliver a supply limited in time. The very oscillator OSC and its associated monostable circuit, which were described as a preferred approach for starting up the system, might be replaced with other techniques, such as momentarily applying two identical signals to the inputs of comparator COMP, say two pulses generated by a monostable circuit similar to the one described above, thus dispensing with an auxiliary oscillator. In other words, the basic concept of the invention should be seen in using a high-security comparator as a generator to supply the very logic which generates the monitoring signals, i.e. the signals responsible for keeping up the supply.

I claim:

1. An inherent-security electric supply circuit having for a machine control system, characterized in that it comprises:

an inherent-security signal comparator, driven by two or more input signals delivered by different parts of the control system, and capable of generating an alternate output signal of a predetermined frequency whenever both its input signals are identical, and of terminating said output signal whenever either said input signals wander off from identity, or anyone of its circuit components breaks down, or its d.c. supply is interrupted;

an amplifier driven by said alternate output signal, and in its turn driving an isolating transformer coupled to a voltage rectifier/regulator device for the supply to said control system.

2. The supply circuit of claim 1, characterized in that said inherent-security comparator comprises a first and a second transistors having respective control electrodes driven by said input signals, respectively, and respective collectors biased by a supply voltage, whereby a resonator is inserted between the collector of the first transistor and said supply voltage, and respective emitters connected in common to a resistor leading to ground; and in that the collector of the first transistor is further capacitively coupled to the control electrode of the second transistor.

3. The supply circuit of claim 1, characterized in that the frequency of said alternate output signal from the inherent-security comparator is about 50 kHz.

4. The supply circuit of claim 1, characterized in that it further comprises an oscillator having a frequency substantially equal to the frequency of the output signal from the comparator, and supplied by a voltage pulse generated by a monostable circuit momentarily enabled at the start-up of the supply circuit, and in that the oscillator output is connected to the input of said amplifier, in common with the output of said high-security comparator.

5. The supply circuit of claim 4, characterized in that said monostable circuit comprises a capacitor and charging means therefor, which charging means are supplied from a voltage source of an opposite sign to the sign of the supply voltage required for the operation of said oscillator, and delayed switching means connected for grounding the charged plate of the capacitor while connecting the opposite plate to said oscillator.

6. The supply circuit of claim 5, characterized in that said capacitor has one plate connected to the junction of two diodes which are connected to ground and to said oscillator, respectively, and the opposite plate connected in common both to a continuous voltage source of a sign opposite to the sign of the supply voltage required for the said oscillator and to a switch to ground which is normally open and which is arranged to close with a delay with respect to the application of said voltage to said capacitor.

7. The supply circuit of claim 6, characterized in that said switch is an electronic device having a control terminal connected to said voltage source of a sign opposite to the sign of the supply voltage required for said oscillator via delaying means comprising resistance and capacitance.

* * * * *